United States Patent [19]
Caffey et al.

[11] Patent Number: 5,615,543
[45] Date of Patent: Apr. 1, 1997

[54] ROTARY CUTTING HEAD

[76] Inventors: Hyram J. Caffey, P.O. Box 953, Abilene, Tex. 79604; Craig A. Caffey, 301 Westview Dr., Abilene, Tex. 79603

[21] Appl. No.: 422,785

[22] Filed: Apr. 17, 1995

Related U.S. Application Data

[63] Continuation-in-part of Ser. No. 17,260, Jan. 10, 1994, abandoned, which is a continuation-in-part of Ser. No. 769,670, Oct. 1, 1991, abandoned.

[51] Int. Cl.$^6$ .................................................. A01D 34/73
[52] U.S. Cl. ...................... 56/295; 56/DIG. 17; 56/12.7; 30/276; 30/347
[58] Field of Search ..................... 56/295, 255, DIG. 17, 56/DIG. 20, 12.7; 30/276, 347

[56] References Cited

U.S. PATENT DOCUMENTS

| | | | |
|---|---|---|---|
| D. 331,930 | 12/1992 | Whetsel . | |
| 3,831,278 | 8/1974 | Voglesonger . | |
| 4,054,992 | 10/1977 | Ballas et al. . | |
| 4,062,114 | 12/1977 | Luick . | |
| 4,118,865 | 10/1978 | Jacyno . | |
| 4,126,990 | 11/1978 | Fisher et al. | 56/295 |
| 4,268,964 | 5/1981 | Moore . | |
| 4,362,007 | 12/1982 | Kennedy et al. | 56/295 |
| 4,501,332 | 2/1985 | Straayer . | |
| 4,513,563 | 4/1985 | Roser et al. | 56/295 |
| 4,619,105 | 10/1986 | Baba . | |
| 4,642,976 | 2/1987 | Owens . | |
| 4,756,146 | 7/1988 | Rouse | 56/295 |
| 4,864,728 | 9/1989 | Kloft et al. . | |
| 4,905,465 | 3/1990 | Jones et al. . | |
| 4,922,694 | 5/1990 | Emoto . | |
| 5,048,278 | 9/1991 | Jones et al. | 56/295 |
| 5,092,112 | 3/1992 | Buckendorf, Jr. . | |
| 5,136,782 | 8/1992 | Calcinai . | |
| 5,197,264 | 3/1993 | Lacey . | |

FOREIGN PATENT DOCUMENTS

| 15877 | 1/1978 | Australia | 56/295 |

*Primary Examiner*—Terry Lee Melius
*Assistant Examiner*—Heather Shackelford
*Attorney, Agent, or Firm*—Stephen R. Greiner

[57] ABSTRACT

A rotary cutting head adapted for attachment to a conventional line trimmer including a cutting disk having a circular plate and a peripheral side wall integral with the circular plate. The peripheral side wall has a pair of integral gussets, each having a pair of radial bores passing therethrough. A flexible cutting filament is frictionally engaged within each pair of radial bores such that one end of the cutting filament extends outwardly from the peripheral side wall.

8 Claims, 1 Drawing Sheet

ROTARY CUTTING HEAD

This application is a continuation-in-part of the application, Ser. No. 29/017,260, filed Jan. 10, 1994 now abandoned, which is a continuation-in-part of 07/769,670, now abandoned.

FIELD OF THE INVENTION

The present invention relates generally to motorized harvesters and, more particularly, to a novel cutting head for use therewith.

BACKGROUND OF THE INVENTION

Line trimmers for cutting grass and the like utilizing flexible cutting filaments rotating at high speeds are widely known. Typical line trimmers include a long, handled shaft having a rotating cutting head at the free end thereof driven by an associated motor. During use, the motor rapidly rotates the cutting head whose outwardly extending filaments may be maneuvered by a user to cut grass to any desired length. Such machines are particularly useful for trimming in areas difficult to access with a standard lawnmower.

Restoring the length of the cutting filaments as they wear is often a tedious process, however. In some cutting heads, spools of filament material are housed in a casing which must be partially disassembled so that the filament material can be extended therefrom by pulling. Aside from the inconvenience of having to open the casing to access the filament material, tangling of the material therein is common. Even cutting heads having so-called automatic feed mechanisms, are not immune to this latter problem.

In general, the cutting heads heretofore available are relatively complex in their construction, cumbersome to use, and lack versatility because such are adapted for use only with a trimmer having a specific construction. A need, therefore, exists for a rotary cutting head that is easy to use, economical to manufacture, and universally installable on a multiplicity of line trimmers.

SUMMARY OF THE INVENTION

Accordingly, it is a principal object of the invention to provide an improved rotary cutting head for attachment to a conventional line trimmer having an uncomplicated construction. The rotary cutting head is provided with a cutting disk having a circular plate and a peripheral side wall integral with the circular plate. The peripheral side wall includes a pair of integral, reinforcing gussets, each having a pair of radial bores of varying diameter passing therethrough. A flexible cutting filament is frictionally engaged within each pair of radial bores such that one end of the cutting filament extends outwardly from the peripheral side wall. Ready access to the flexible cutting filament for replacement thereof is provided through the open bottom surface of the cutting disk.

It is a further object of the invention to provide a unique cutting filament for use with the cutting disk of the type described having a shaft portion of predetermined length and an integral retaining flange at one of its ends.

It is an object of the invention to provide improved elements and arrangements thereof in a rotary cutting head for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

The present invention may be more readily described with reference to the accompanying drawings, in which.

Similar reference characters denote corresponding features consistently throughout the accompanying drawings.

DETAILED DESCRIPTION OF THE PREFERRED EMBODIMENT

Figure 1:
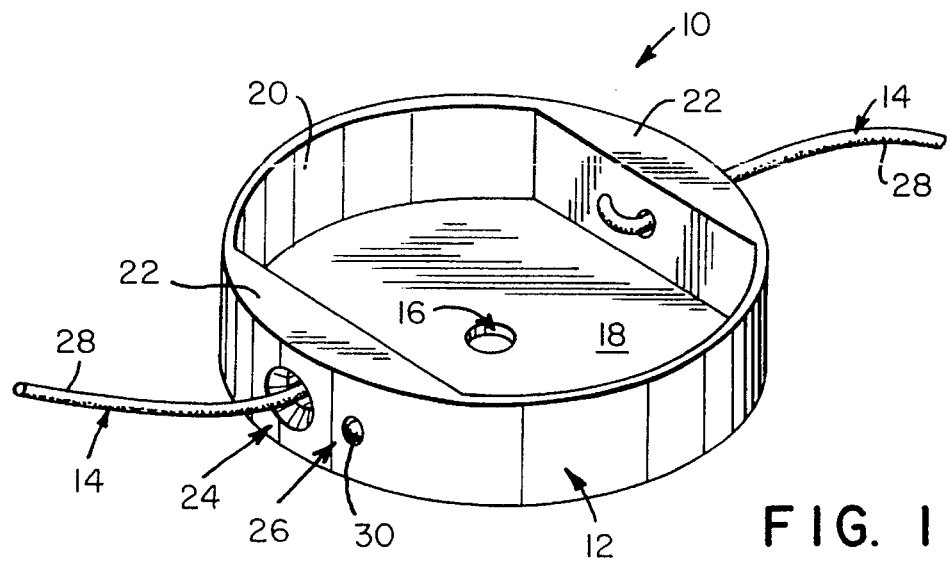
FIG. 1 is a perspective view of a rotary cutting head in accordance with the present invention.

Referring now to the figures, a rotary cutting head in accordance with the present invention is illustrated generally at 10. As shown, the rotary cutting head 10 preferably includes a cutting disk 12 having a pair of flexible cutting filaments 14 extending outwardly from the opposing sides thereof. A central bore 16 in the cutting disk 12 permits attachment thereof to the threaded drive pin of a conventional line trimmer (not shown) in the usual manner with a fastening nut. By varying the diameter of the central bore 16, the rotary cutting head 10 may be adapted for mounting upon virtually any line trimmer presently available in the marketplace.

The preferred cutting disk 12 comprises a thin, flat, circular plate 18 which has been provided with the central bore 16 referred to hereinabove. A peripheral side wall 20 extends at right angles from the bottom surface of the circular plate 18 and is preferably reinforced with a pair of integral gussets 22. Preferably, each of the gussets 22 is of substantially equal size and mass. As shown, the gussets 22 are also preferably positioned directly opposite each other along the peripheral side wall 20 for counterbalance purposes. For maximum strength and durability, the circular plate 18, peripheral side wall 20 and gussets 22 are cast as a single unit from a lightweight aluminum alloy. Any other suitable material(s) may be used, however, to form the cutting disk 12.

A pair of radial bores 24 and 26 in each of the gussets 22 permit the selective attachment of cutting filaments 14 to the cutting disk 12. Each cutting filament 14 is preferably formed from a thermoplastic material and includes a flexible shaft portion 28 having an integral retaining flange 30 at one of its ends. The retaining flange 30 is preferably formed by contacting a selected end of the shaft portion 28, which has been previously cut to a suitable length, with a surface heated sufficiently to permit localized melting of the thermoplastic material at its point of contact with the heated surface. Continued movement of the shaft portion 28 against the heated surface creates a relatively small bead of permanently deformed thermoplastic material on the end of shaft portion 28 which defines the retaining flange 30. When cooled, the retaining flange 30 is rigidly affixed to the shaft portion and fully formed, thus no additional machining is required for use of the cutting filament 14.

Figure 2:
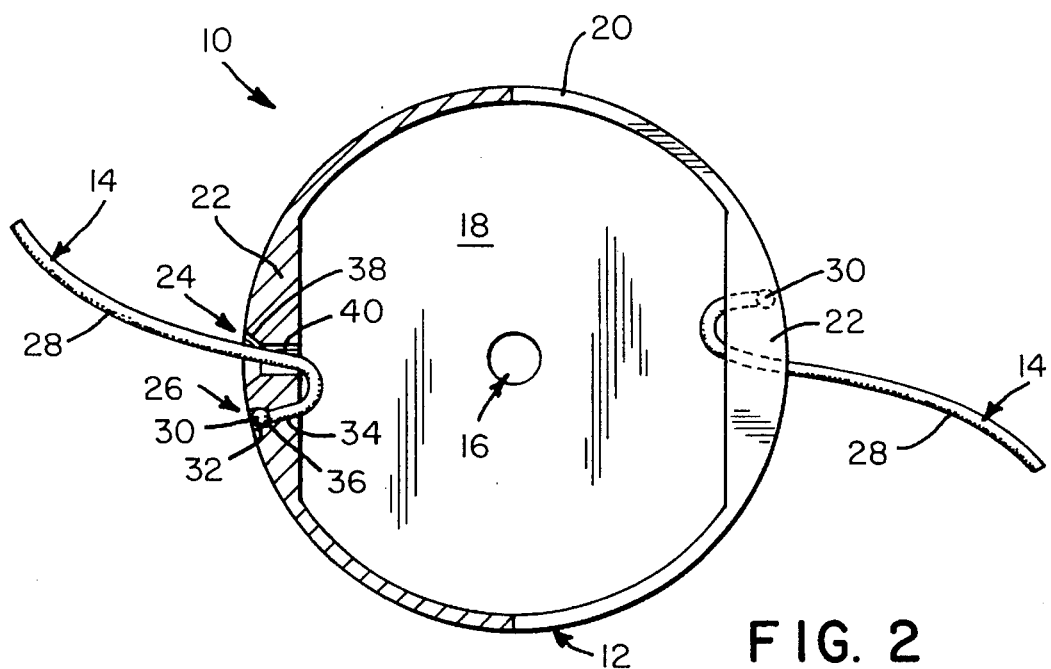
FIG. 2 is a bottom plan view of the rotary cutting head of FIG. 1, partially broken away to show details thereof.
Figure 3:
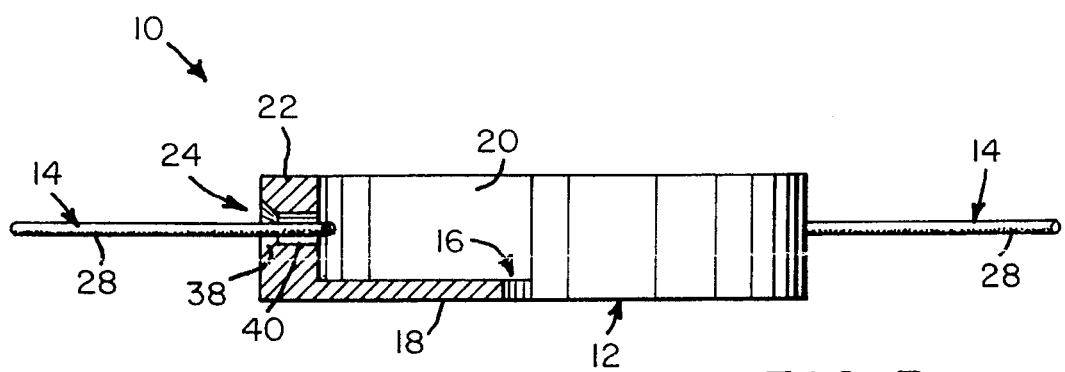
FIG. 3 is a side elevational view of the rotary cutting head, partially broken away to show details thereof.

With particular reference to FIG. 2, the bores 24 and 26 may be seen to be aligned radially from the center of the cutting disk 12. As shown, the bore 24, provided for the extension of the cutting filament 14 from the cutting disk 12, is positioned midway between the ends of the gusset 22. The relatively smaller diameter bore 26, for retaining the flange 30 of the cutting filament 14, is positioned closely adjacent the bore 24. Together the bores 24 and 26 cooperate to extend the useful life of the cutting filaments 14 by crimping the cutting filaments into a U-shape which prevents the cutting filaments from undesirably rotating against the cutting disk 12 during use. Such rotation is believed to cause excessive wear to the cutting filaments 14 and increase the opportunity for premature filament failure.

As shown, the radial bore 26 includes an outer section 32 and an inner section 34 having a relatively smaller diameter so as to form a flange retaining shoulder 36 at their junction. The outer section 32 is preferably sized to closely receive the retaining flange 30 of cutting filament 14 without the retaining flange projecting from the periphery of the cutting disk 12. The inner section 34, on the other hand, is preferably sized to closely receive and support the shaft portion 28 of cutting filament 14.

The radial bore 24 is also preferably provided with an outer section 38 and an inner section 40 of different diameters. With continuing reference to FIG. 2, the inner section 40 may be seen to be preferably provided with a diameter that is twice as large as that of flexible shaft portion 28 as well as the inner section 34 of bore 26 so as to permit the easy withdrawal of a worn cutting filament 14 therefrom. The outer section 38 is conical in shape with its side walls sloping inwardly at an angle of about 45 degrees. The maximum diameter of the outer section 38 is found at the periphery of the cutting disk 12 and is approximately twice as large as the diameter of the inner section 40.

As should be apparent, the conical outer section 38 permits easy access to a worn cutting filament 14 by the fingers of a user. The conical outer section also reduces the likelihood of shaft portion 28 of the cutting filament 14 shearing off upon impact of the cutting disk 12 with a substantially immovable object during use. The sloping walls of the outer portion 38 permit the cutting filament 14 to lay closely against the periphery of the cutting disk 12 in such instances.

For use, the cutting disk 12 is simply attached to a conventional line trimmer in the usual fashion with the free edge of the peripheral side wall 20 directed toward the ground surface. After positioning a pair of flexible cutting filaments 14 in the radial bores 24 and 26 as outlined hereinabove, the assembled cutting head 10 may be rotated rapidly by the line trimmer motor. The outwardly extending cutting filaments 14 may then be used for trimming grass along building foundations, edging concrete sidewalks and mowing small lawn areas. The replacement of worn cutting filaments 14 may be accomplished in a matter of seconds by simply removing the worn filament and inserting a new one.

While the invention has been described with a high degree of particularity, it will be appreciated by those skilled in the art that numerous modifications and substitutions may be made thereto. For example, the height of the peripheral side wall 20 and the relative distance of the radial bore 24 to the free edge thereof may be varied to effectively space the cutting filament 14 at any desired distance from the ground surface during use. Therefore, it is to be understood that the present invention is not limited to the sole embodiment described above, but encompasses any and all embodiments within the scope of the following claims.

We claim:

1. A rotary cutting head, comprising:

a cutting disk having a circular plate and a peripheral side wall integral with said circular plate;

said circular plate having a central bore;

said peripheral side wall having a pair of integral gussets positioned opposite one another, each of said gussets having a pair of radial bores passing therethrough, and each said pair of radial bores including a first radial bore having:

a first outer section for receiving therein said integral retaining flange of said flexible cutting filament; and, a first inner section in axial alignment with said first outer section, said first inner section having a diameter smaller than that of said first outer section for closely receiving therein said flexible shaft portion of said flexible cutting filament; and, a flexible cutting filament frictionally engaged within each said pair of radial bores such that one end of said cutting filament extends outwardly from said peripheral side wall, and each said flexible cutting filament including a flexible shaft portion having an integral retaining flange at one of its ends.

2. The rotary cutting head according to claim 1 wherein each said pair of radial bores further comprises a second bore including:

a conical outer section; and, a second inner section in axial alignment with said conical outer section, said second inner section having a diameter substantially twice as large as that of said flexible shaft portion of said flexible cutting filament.

3. The rotary cutting head according to claim 1 wherein said cutting disk is integrally cast from an aluminum alloy.

4. A cutting disk, comprising:

a circular plate having a central bore; and, a peripheral side wall integral with said circular plate, said peripheral side wall having a pair of integral gussets positioned opposite one another, each of said gussets having a pair of radial bores passing therethrough, and each said pair of radial bores including a first radial bore having:

a first outer section; and, a first inner section in axial alignment with said first outer section, said first inner section having a diameter smaller than that of said first outer section.

5. The cutting disk according to claim 4 wherein each said pair of radial bores further comprises a second radial bore including:

a conical outer section; and, a second inner section in axial alignment with said conical outer section, said second inner section having a diameter substantially twice as large as that of said first inner portion.

6. The cutting disk according to claim 4 wherein said circular plate, peripheral side wall and pair of gussets are integrally cast from an aluminum alloy.

7. A rotary cutting head, comprising:

a cutting disk having a circular plate and a peripheral side wall integral with said circular plate;

said circular plate having a central bore;

said peripheral side wall having a pair of integral gussets positioned opposite one another, each of said gussets having a pair of cooperating, first and second radial bores passing therethrough;

said first radial bore including:

a first outer section; and, a first inner section in axial alignment with said first outer section, said first inner section having a diameter smaller than that of said first outer section;

a flexible cutting filament frictionally engaged within each said pair of cooperating radial bores, each flexible cutting filament having a flexible shaft portion and an integral retaining flange disposed at one end thereof, each said integral retaining flange positioned within one said first outer section of said first radial bore and said flexible shaft portion extending outwardly from said second radial bore.

8. The rotary cutting head according to claim 7 wherein said second radial bore includes:

a conical outer section; and, a second inner section in axial alignment with said conical outer section, said second inner section having a diameter substantially twice as large as that of said flexible shaft portion of said flexible cutting filament.

* * * * *